United States Patent Office 2,960,509
Patented Nov. 15, 1960

2,960,509
TRIMELLITIC IMIDE-AMIDE

James R. Stephens, Gary, Ind., assignor to Standard Oil Company, Chicago, Ill., a corporation of Indiana No Drawing. Filed Mar. 20, 1959, Ser. No. 800,641

2 Claims. (Cl. 260—326)

This invention relates to the novel compound trimellitic amide imide and to a method of preparation thereof.

Trimellitic amide imide may also be called 4-carbamylphthalimide. A simple structural configuration of this compound is set out below:

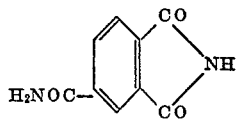

Trimellitic amide imide is readily prepared from trimellitic triamide by heating said triamide to its decomposition temperature wherein upon the trimellitic amide imide is formed, however, it is preferred to prepare the trimellitic amide imide by contacting trimellitic triamide with liquid water at a temperature from about 80° C. to about 120° C. The contacting between the triamide and the liquid water is continued until the triamide has passed into "solution" in said water. The triamide decomposes and the material which goes into solution is the trimellitic amide imide; ammonia is evolved from the reaction zone showing that conversion of the trimellitic triamide is taking place. The trimellitic amide imide may be recovered by distilling off the water or by cooling the water solution until the solute precipitates out of solution.

Example

Trimellitic triamide, 3.7 grams, and 100 ml. of water were boiled until all of the trimellitic triamide had passed into "solution" and evolution of ammonia had ceased. The solution was concentrated by boiling until solid material could be precipitated from solution when the solution was cooled to room temperature, about 25° C. The solid precipitate was recovered by filtration and dried.

The solid prepared by this method melted at 312° C. on the Fischer-Johns stage. Infrared inspection of the solid concurs with the amide imide configuration.

Trimellitic amide imide reacts with formaldehyde to form N-methylolated derivatives, which can be used as such, or preferably, with the addition of inert fillers, in the preparation of thermoset resin articles.

This is a continuation-in-part of my co-pending application Serial No. 799,839, filed March 17, 1959.

Thus having described the invention, what is claimed is:
1. Trimellitic amide imide.
2. A method for preparing trimellitic amide imide which method comprises intermingling liquid water and trimellitic triamide at a temperature from about 80° C. to about 120° C. until ammonia ceases to be evolved indicating essentially complete decomposition of said triamide to trimellitic amide imide, sufficient liquid water being present to dissolve all of said amide imide product and removing water to obtain a solid trimellitic amide imide product.

References Cited in the file of this patent

Perkin et al., J. Chem. Soc. (London), vol. 127 (1925) pp. 2294–2295.